United States Patent
Krishnan (10) Patent No.: US 9,959,188 B1
(45) Date of Patent: May 1, 2018

(54) MANAGING PROCESSOR USAGE OF A PHYSICAL HOST CONFIGURED FOR HOSTING COMPUTING INSTANCES

(71) Applicant: Amazon Technologies, Inc., Seattle, WA (US)

(72) Inventor: Karthikeyan Krishnan, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days. days.

(21) Appl. No.: 14/791,120

(22) Filed: Jul. 2, 2015

(51) Int. Cl.
*G06F 11/30* (2006.01)
*G06F 9/50* (2006.01)
*G06F 9/455* (2006.01)

(52) U.S. Cl.
CPC ...... *G06F 11/3062* (2013.01); *G06F 9/45533* (2013.01); *G06F 9/45558* (2013.01); *G06F 9/50* (2013.01)

(58) Field of Classification Search
CPC .... G06F 9/45558; G06F 9/45533; G06F 9/50; G06F 2009/45591; G06F 3/14; G06F 9/5072; G06F 1/206; H04L 47/70; H04L 67/1095; H04L 47/822
See application file for complete search history.

(56) References Cited

U.S. PATENT DOCUMENTS

| | | | | |
|---|---|---|---|---|
| 2012/0131594 A1* | 5/2012 | Morgan | ............... | G06F 9/5072 718/105 |
| 2012/0159201 A1* | 6/2012 | Distefano | ............... | G06F 1/206 713/300 |
| 2013/0155073 A1* | 6/2013 | Khodorkovsky | ......... | G06F 3/14 345/501 |
| 2015/0185814 A1* | 7/2015 | Ping | ........................ | G06F 1/206 713/323 |
| 2016/0179560 A1* | 6/2016 | Ganguli | .............. | G06F 9/45558 718/1 |

* cited by examiner

*Primary Examiner* — Terrell S Johnson
(74) *Attorney, Agent, or Firm* — Thorpe North & Western, LLP.

(57) ABSTRACT

Technology for detecting processor usage of a physical host hosting computing instances is provided. In one example, a method may include identifying a location of a hardware register of a physical host containing data in a model specific register. The physical host hosts a plurality of computing instances using a hypervisor. The method may include determining power consumption by a processor of the physical host for the computing instances from the data. An upper level of acceptable processor power consumption may be identified. Processor usage may be determined based on the power consumption determined and the upper level of acceptable processor power consumption. The processor usage may be provided as data through the hypervisor.

20 Claims, 7 Drawing Sheets

MANAGING PROCESSOR USAGE OF A PHYSICAL HOST CONFIGURED FOR HOSTING COMPUTING INSTANCES

BACKGROUND

Computing devices often utilize a communication network or a series of communication networks to exchange data. Companies and organizations operate computer networks that interconnect a number of computing devices to support computing operations or provide services to other parties. The computing systems may be located in a single geographic location or may be located in multiple, distinct geographic locations (e.g., interconnected via private or public communication networks). For instance, larger data centers or data processing centers may include a number of interconnected computing systems that provide computing resources to customers of the data center. Using virtualization technologies, utilization of data center resources may be increased by configuring a single physical computing device to host one or more computing instances (i.e. virtualized computing devices) that appear to operate as independent computing devices to users of a data center.

A data center may host any number of computing instances in a single physical computing host of a multi-tenant environment. In other words, a virtualization architecture may host applications and data for multiple customers. In a virtualized environment, a "noisy neighbor" is used to describe a computing infrastructure scenario where computing instance that is a co-tenant with other computing instances on a physical computing host monopolizes bandwidth, disk I/O, CPU and other resources of the physical computing host, and may negatively affect performance of other tenants' applications or computing instances. The noisy neighbor effect may result in computing instances or applications that share the infrastructure suffering from uneven computing or network performance.

Noisy neighbors may be avoided by operating in a single-tenant environment. However, this is not feasible for many customers due to cost or other constraints. Artificially restricting resources available to any computing instance may also reduce the potential for noisy neighbors. However, this may leave some customers with insufficient resources to meet the demand for the customers' applications.

DETAILED DESCRIPTION

Technology for detecting processor usage of a physical host that is hosting computing instances is provided. In one example, a method may include identifying a location of a hardware register of a physical host containing data in a model specific register. The physical host may host a plurality of computing instances using a hypervisor. The method may include determining power consumption of a processor of the physical host for the computing instances from the data retrieved from the hardware register. An upper level of acceptable processor power consumption may be identified. Processor usage may be determined based on the power consumption determined and the upper level of acceptable processor power consumption. The processor usage may be exposed as data or metadata through the hypervisor.

In another example, a method for detecting processor usage of a physical host hosting a plurality of computing instances may include reading data from a model specific register in a hardware register memory of the physical host. Power consumption by a processor of the physical host may be identified from the data. A thermal design point of the processor may be identified. The thermal design point may be indicative of an upper level of acceptable processor power consumption. The thermal design point may be identified by, for example, identifying the processor, such as by make and model, and performing a lookup of the thermal design point based on the identification of the processor. Processor usage may be determined based on the power consumption and the thermal design point. Clock rate frequency and power consumption of processors rise and fall linearly and are directly correlated. As such, the processor usage may be determined in terms of clock rate frequency or processor cycles based on the power consumption and the thermal design point. The method may also include implementing a noisy neighbor remediation policy based on the processor usage. For example, a computing instance may be migrated to a different physical host, a turbo boost of the processor may be initiated, a potential move to the physical host may be ceased, initiation or placement of new software processes or computing instances on the physical host may be suspended, etc.

Figure 1:
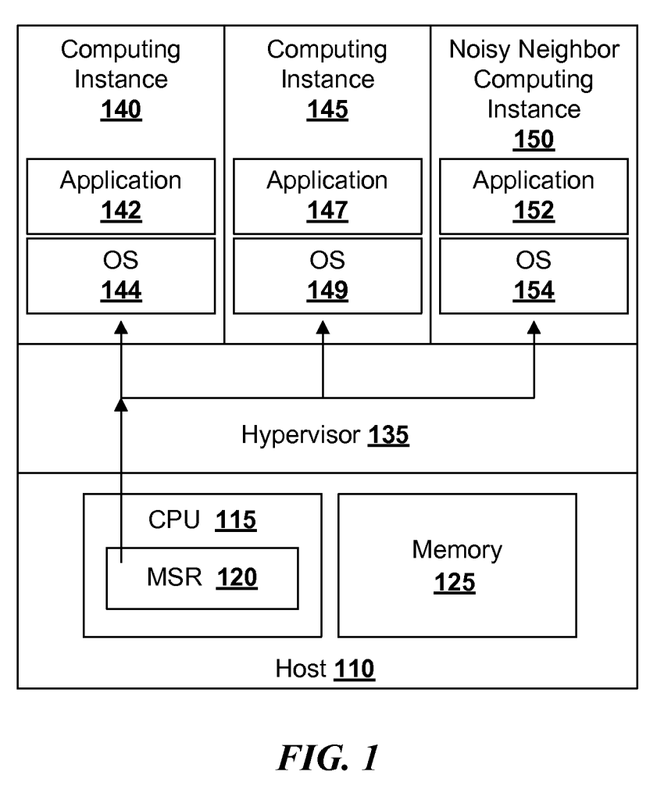
FIG. 1 is a schematic overview of a multi-tenant computing environment sharing hardware resources, where register specific memory of a processor included in the hardware resources is accessed to detect processor usage by computing instances operating on the hardware in accordance with an example of the present technology.

Reference will now be made to FIG. 1. The present technology may enable detection of a noisy neighbor scenario in an efficient way in multi-tenant computing environments, or service provider environments. A noisy neighbor is a scenario where multiple tenants or computing instances 140, 145, 150 co-exist in a hypervisor 135 running on shared hardware (i.e., a host 110) and a particular co-tenant, noisy neighbor computing instance 150, monopolizes central processing unit (CPU 115) usage, network bandwidth, memory 125 or other resources, such as by using over a threshold percentage of the resources, for example. Some prior solutions to the issue have included operating a computing instance in a single tenant environment or instituting a resource usage cap on each computing instance to ensure there is no disproportionate usage of resources. A backend system for placement of computing instances, or control plane for the service provider environment, may be used to manage scheduling efficiently to ensure no single physical host is over-subscribed. While such a backend system is helpful, the implementation relies heavily on the backend scheduler for smart scheduling and includes a large number of alarms to be monitored.

The present technology may operate in a typical multi-tenant service provider environment. For example, as illustrated in FIG. 1, the multi-tenant service provider environment may include a host 110, with hardware, and a hypervisor 135 running on the system hardware, the hypervisor 135 managing multiple computing instances 140, 145, 150 hosted on the system hardware. The computing instances 140, 145, 150 may include operating systems (OSs) 144, 149, 154 and any number of applications 142, 147, 152 or services. The system hardware may include resources such as a processor 115 or central processing unit (CPU), memory 125, storage and the like. The resources may be shared by the multiple computing instances 140, 145, 150, and the computing instances may be associated with multiple customers or tenants.

The present technology enables a tenant to "peek" into or have a narrow view into the underlying physical host utilization without exposing or leaking other details that may violate the privacy of the co-tenants or create security risks for the co-tenants or the service provider. Current processors from hardware companies include single socket or multi-socket processors. Each socket may house multiple chips and each chip may have multiple processors or processor cores, including hyperthreaded processors, and these processors operate within a power budget. The power inputs are separated per physical core. The power drain by a socket or a physical core may be estimated using data stored in hardware registers called model specific registers (MSRs 120). Given a particular class of processor and the current values stored in these model specific registers, the actual power drain of the processor may be detected. By comparing the power drain to the thermal design point (TDP), or thermal design power, of the processor, the processor usage of the underlying host may be determined.

The thermal design point may be measured in watts and may represent an amount of heat expected to be generated by the processor in a realistic, heavy-use scenario. A thermal design point value may represent the power being consumed by the processor or the thermal output of the processor, which are related. Oftentimes, processors may have performance limiting features which reduce the processor performance if the thermal design point is exceeded. The thermal design point may thus represent a value close to a peak performance of the processor. Comparing the power drain on the processor at a given time against the thermal design point may provide at least a rough estimation of processor usage or processor usage compared with a processor usage under a realistic, heavy load.

In some situations, the demand for resources by the applications 142, 147, 152 may be met despite a noisy neighbor consuming an inordinate amount of the processor 115 by enabling computing instances to activate the turbo mode or an overclocking mode. Some processors provide a turbo boost or overclocking functionality which enables the thermal design point to be exceeded in a burst at least for a short period of time. Thus, the thermal design point may not represent the power drain of the processor at maximum performance, but may be a starting point for a calculation. For example, a processor may have a thermal design point of 80 W but may be overclocked to 100 W. As another example using different terminology, a 2.8 GHz processor may be overclocked to 3 GHz. Frequency and power consumption rise and fall linearly and are directly correlated. Different manufacturers may have guidelines for exceeding the thermal design point which may be used to determine the amount of headroom or available differential for overclocking or boosting above the thermal design point. Similarly different classes of processors may have a designated value for overclocking or boosting above the thermal design point.

By determining the power drain and the thermal design point, as well as potential for exceeding the thermal design point, the present technology may quickly determine if there is any headroom for turbo boost to be activated. If there is enough power budget, the processor(s) 115 may dynamically overclock into turbo mode. In one example, the present technology may be a part of the hypervisor 135 or may interact with the hypervisor 135 as part of one or more of the computing instances 140, 145, 150. For example, the hypervisor 135 or a computing instance 140, 145, 150 via the hypervisor 135 may send a signal to the processor(s) 115 to overclock into turbo mode.

Overclocking the processor(s) 115 may be performed when an application 142, 147, 152 requests or plans to request more of the processor usage than is currently available within the thermal design point. However, if headroom for overclocking exists, then the processor may be overclocked and the application on the computing instance may be granted the processing time requested. By enabling computing instances to activate the turbo mode, the demand for resources by the applications 142, 147, 152 may be met despite the fact that a noisy neighbor has been identified and noisy neighbor is consuming an inordinate amount of the processor 115.

Analysis of the data in the model specific registers 120 may allow for the configuration of various aspects of the hardware, which may affect the firmware and/or software executing on the hardware. In a multi-tenant environment, model specific registers have previously been unavailable for read or write operations by the computing instances hosted on the hardware to ensure secure and uninterrupted operation of the multiple computing instances. The model specific registers may be used to turn on or off features of the hardware or to fine time hardware level operations.

The present technology enables read access for the hypervisor 135 in accessing the data model specific registers 120 for computing the power drain of the processors 115 and further enables the data read by the hypervisor 135 to be exposed to the computing instances 140, 145, 150. The hypervisor 135 is given programmatic access to the model specific registers and is permitted to expose the power consumption data. The model specific register 120 or model specific registers accessed by the hypervisor to expose the power consumption data may be a subset of the available model specific registers. The model specific register 120 may be located on a processor chip, in high speed memory associated with the processor 115 or in another quickly accessible memory location.

Even with the prior solutions for addressing noisy neighbor issues, detecting a noisy neighbor as a co-tenant with that noisy neighbor is challenging. Monitors may be used to attempt to infer a noisy neighbor from monitored data, but clear determinations of oversubscription of a host may be difficult. The present technology may assist in avoiding noisy neighbor scenarios and may enable customers to easily identify whether a host is oversubscribed and may further provide remedial options for addressing the issue to ensure the customer's applications are not negatively impacted by noisy neighbors.

Figure 2:
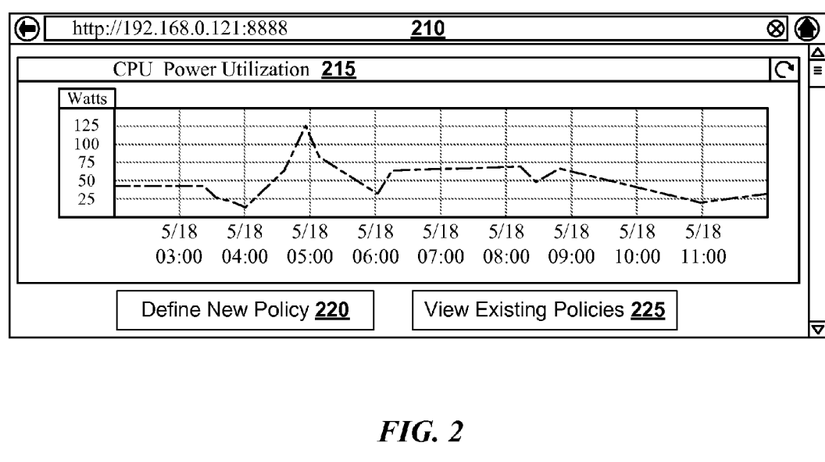
FIG. 2 is an example browser interface for viewing processor usage over time and managing policies associated with the processor usage in accordance with an example of the present technology.

The hypervisor 135 may expose the data from the model specific registers to the computing instances 140, 145, 150 either in the raw, original form or in a modified form, such as in FIG. 2. FIG. 2 illustrates an example browser interface for viewing processor usage over time and managing policies associated with the processor usage in accordance with an example of the present technology. In FIG. 2, for example, the processor power draw may be exposed to the computing instances by accessing a Uniform Resource Locator (URL) 210 with the data made available as text or in a graphical format via a graphical user interface, such as a browser window. The processor power draw may be illustrated as a processor power utilization 215, where the power draw correlates with processor utilization. In some examples, the data may be exposed through API (Application Programming Interface) calls, Software Develop Kit (SDK) operations, a command line interface, etc.

Typically, processor power utilization 215 is used as an alarm and is not accurate at the level of granularity available when using the model specific registers. For example, a frequency of a monitor for an alarm may be 1 second, which may be a long time for a processor which may have time slices counted in milliseconds or fractions or milliseconds. By using a model specific register based method and a backend system to monitor the processor(s), noisy neighbors may be avoided or eliminated and the technology provides a more rapid mechanism to detect noisy neighbors and take remedial action if desired.

The model specific registers may store the current power data. For example, the data stored in the model specific register may be similar to a counter that is continually and automatically written to and, when read out, produces the last written value. Each class of processors has a model specific register. The model specific registers may vary for each generation of processor. In accessing the data in the model specific register for the power drain, other data points may also be available from the model specific registers. For example, the read output of other model specific registers may include CPU speed, DRAM power consumption and so forth. For purposes of the present technology, the CPU power consumption is the value desired which may be used to determine processor usage or the availability of the processor. The CPU power consumption may be the value exposed to the computing instance(s).

The present technology may enable the hypervisor to detect the actual processor present in the hardware. A CPUID opcode, a processor supplementary instruction (its name derived from CPU IDentification) for the x86 architecture, may be used to discover details of the processor. The CPUID opcode may be used to obtain an ID string which may be an integer that identifies the processor. The CPID may be associated with a processor make and model, for example. A mapping data store that stores a mapping between the CPID and information about the processor make and model may be accessed by the hypervisor to identify the make and model from the code. The mapping data store may further map the make and model to model specific registers available for the identified processor. After identifying the model specific registers for a particular processor, the hypervisor may access the desired model specific register storing the CPU power consumption data in order to expose the power consumption data to the computing instances. The customers are prevented from directly accessing the model specific registers due to the computing instances and hypervisor, and the customers are restricted to viewing data extracted from the model specific registers.

The customers or an administrator may define and/or manage noisy neighbor remediation rules or policies, such as through interface elements 220, 225. The noisy neighbor remediation rules may be actions which are taken when a noisy neighbor is detected. For example, when the actual power consumption as compared to the thermal design point is above a predetermined threshold (e.g., a specified ratio value), then a noisy neighbor remediation rule may be put into effect. Any of a variety of rules may be implemented. For example, a computing instance may be migrated to a different physical host, a turbo boost of the processor may be initiated, a potential move to the physical host may be ceased, initiation of new software processes or instances on the physical host may be suspended or delayed, etc.

By permitting access to the data from the model specific registers, power used and a processor peak may be determined without exposing the model specific registers themselves to the customers. The power consumption may be a collective consumption of each core and/or each socket of the processor, or the power consumption may include specific information about each of the cores and/or sockets. A customer application may use the noisy neighbor remediation rules to determine whether to migrate to another system or perform some other defined operation. Customers may easily determine whether a system is oversubscribed in a way that may negatively affect performance of the customer's applications.

In a multi-tenant environment, an individual host may be commonly operated at 40-50% capacity. At this level of operation, spikes or peaks in operation may be typically manageable without having a detrimental effect on the performance of the computing instances, at least in the absence of a noisy neighbor. When the host is consistently operated at 70-85% capacity, spikes may be less manageable and one or more instances may be migrated to another host. A host typically operating at 40-50% capacity may experience spikes in demand and overclocking may be used to better accommodate usage during a spike.

The present technology may optionally monitor the processor usage over a period of time to determine a typical capacity or usage and also to identify peaks, patterns in usage and so forth. As a result, a customer may determine whether the particular host is presently able to provide the processor availability desired for the customer's applications. A landscape of a multi-tenant host may change over time where tenants may come and go. A computing instance may thus periodically check or monitor processor usage to determine whether a noisy neighbor scenario exists and whether to take any remedial actions based on the noisy neighbor remediation rules.

In one example, a noisy neighbor remediation rule may specify an automatic migration policy. Whenever a noisy neighbor threshold (e.g., predetermined acceptable upper limit of processor usage) goes above 40%, 50%, 60%, 70% or some other predefined percentage of processor consumption, then the computing instance may initiate a migration to another host. The migration may lead to some down time, but with sufficient redundancy the downtime may be avoided and/or the lack of operation of one or more servers during the migration may be unnoticeable. A migration may not guarantee that the target host of the migration is not also oversubscribed. However, an efficient migration system may be able to mitigate the likelihood of a target host also being oversubscribed. The migration system may use various efficient placement methods and/or may use the present technology to check the processor usage at the target host before performing the migration.

Figure 3:
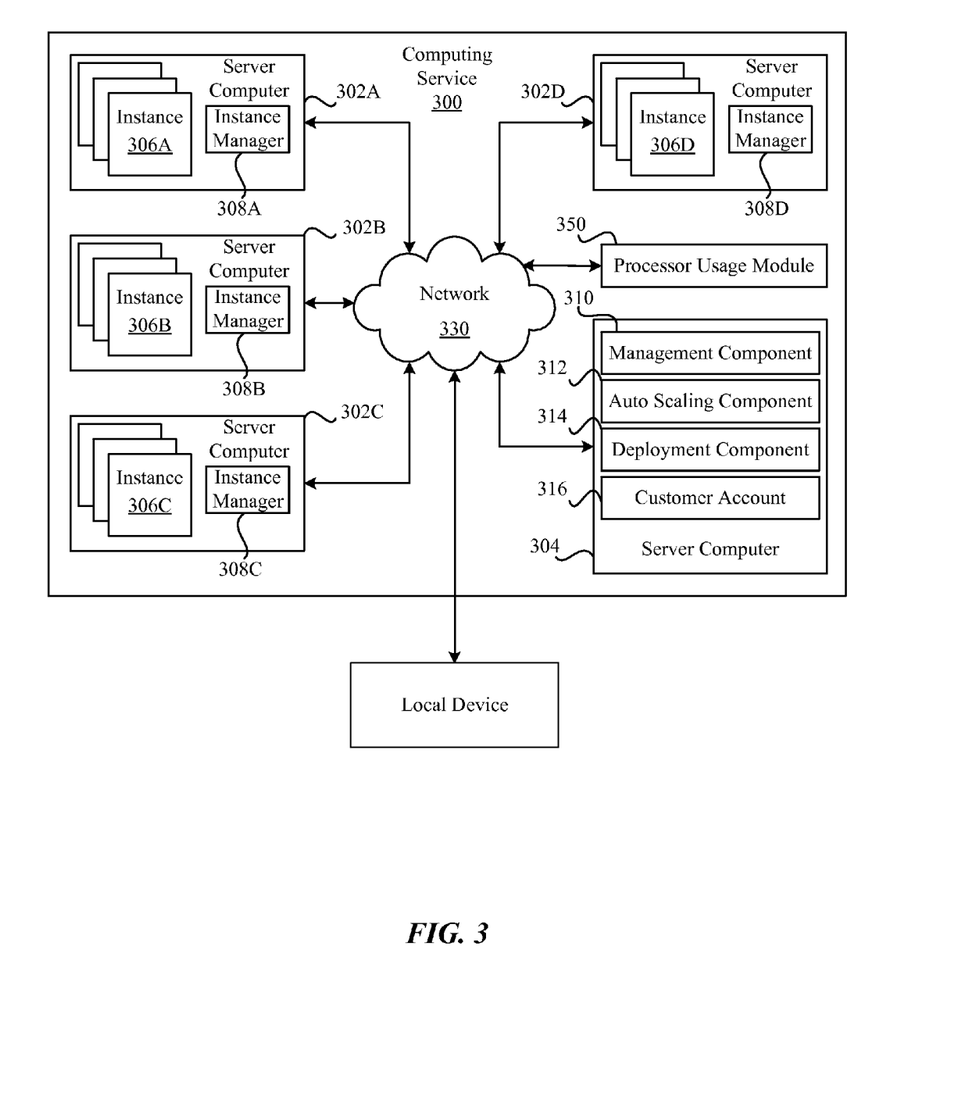
FIG. 3 is a schematic overview of a virtual computing resource provider in accordance with an example of the present technology.

FIG. 3 illustrates how components of a computing service 300 in a service provider environment may operate. The computing service 300 (i.e., the cloud provider or service provider) may be capable of delivery of computing and storage capacity as a service to a community of end recipients. In an example implementation, the computing service may be established for an organization or on behalf of the organization. That is, the computing service 300 may offer a "private cloud environment." In another implementation, the computing service 300 may support a multi-tenant environment, wherein a plurality of customers operate independently (i.e., a public cloud environment). Generally speaking, the computing service 300 can provide the following models: Infrastructure as a Service ("IaaS"), Platform as a Service ("PaaS"), and/or Software as a Service ("SaaS"). Other models may also be provided. In some implementations, end users access the computing service 300 using networked client devices, such as desktop computers, laptops, tablets, smartphones, etc. running web browsers or other lightweight client applications. Those skilled in the art will recognize that the computing service 300 can be described as a "cloud" environment.

The particularly illustrated computing service 300 may include a plurality of server computers 302A-302D. While four server computers are shown, any number may be used, and large centers may include thousands of server computers. The server computers 302A-302D may be media servers, for example. The server computers 302A-302D may provide computing resources for executing software computing instances 306A-306D. In one implementation, the instances 306A-306D may be virtual machines. A virtual machine may be an instance of a software implementation of a machine (i.e. a computer) that executes applications like a physical machine. In the example of virtual machine, each of the servers 302A-302D may be configured to execute an instance manager 308 capable of executing the instances. The instance manager 308 may be a hypervisor or another type of program configured to enable the execution of multiple instances 306 on a single server. Additionally, each of the instances 306 may be configured to execute one or more applications.

It should be appreciated that although the implementations disclosed herein are described primarily in the context of virtual machines, other types of instances can be utilized with the concepts and technologies disclosed herein. For instance, the technologies disclosed herein can be utilized with storage resources, data communications resources, and with other types of computing resources. The implementations disclosed herein might also execute all or a portion of an application directly on a computer system without utilizing virtual machine instances.

One or more server computers 304 may be reserved for executing software components for managing the operation of the server computers 302 and the instances 306. For example, the server computer 304 may execute a management component 310. A customer may access the management component 310 to configure various aspects of the operation of the instances 306 purchased by the customer (i.e., the administrator of a service to be executed using the instances and made available to traffic from client devices). For example, the customer may purchase, rent or lease instances and make changes to the configuration of the instances. The customer may also specify settings regarding how the purchased instances are to be scaled in response to demand. An auto scaling component 312 may scale the instances 306 vertically or horizontally based upon rules defined by the customer. In one implementation, the auto scaling component 312 allows a customer to specify scale-up policies for use in determining when new instances should be instantiated, including what type of instance to instantiate, and scale-down policies for use in determining when existing instances should be terminated. The auto scaling component 312 may consist of a number of subcomponents executing on different server computers 302 or other computing devices. The auto scaling component 312 may monitor available computing resources over an internal management network and modify resources available based on predictions of need as well as based on actual need.

A deployment component 314 may be used to assist customers in the deployment of new instances 306 of computing resources. The deployment component 314 may have access to account information associated with the instances, such as who is the owner of the account, credit card information, country of the owner, etc. The deployment component 314 may receive a configuration from a customer that includes data describing how new instances 306 should be configured. For example, the configuration may specify one or more applications to be installed in new instances 306, provide scripts and/or other types of code to be executed for configuring new instances 306, provide cache logic specifying how an application cache should be prepared, and other types of information. The deployment component 314 may utilize the customer-provided configuration and cache logic to configure, prime, and launch new instances 306. The configuration, cache logic, and other information may be specified by a customer using the management component 310 or by providing this information directly to the deployment component 314.

Customer account information 316 may include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc. Information such as the unique identifier, IP addresses used to access the account and so forth may be used in authenticating a user to the service provider environment. Additionally, the customer account information 316 may include wakefulness data, such as sleep patterns or cycles, historical wakefulness data received from the user's wakefulness detectors, identification of the wakefulness detectors available to the user, user-specific models for determining that the user is asleep or for setting a resume playback position and so forth.

A processor usage module 350 may determine a processor usage. For example, the processor usage module 350 may be part of a hypervisor or instance manager 308A-D, or may be separate as illustrated, and may be configured to access a model specific register for the host server computer 302A-D. In another example, the processor usage module 350 may be a service or process executing on or available to the instances 306A-D. The processor usage module 350 may identify the processor to identify the thermal design point of the processor. The processor usage module 350 may determine processor usage as compared with the thermal design point and cause one or more noisy neighbor remedial action policies to be implemented.

A network 330 may be utilized to interconnect the server computers 302A-302D and the server computer 304. The network 330 may be a local area network (LAN) and may be connected to a Wide Area Network (WAN) so that end users may access the computing service 300. It should be appreciated that the network topology illustrated in FIG. 3 has been simplified and that many more networks and networking devices may be utilized to interconnect the various computing systems disclosed herein.

Figure 4:
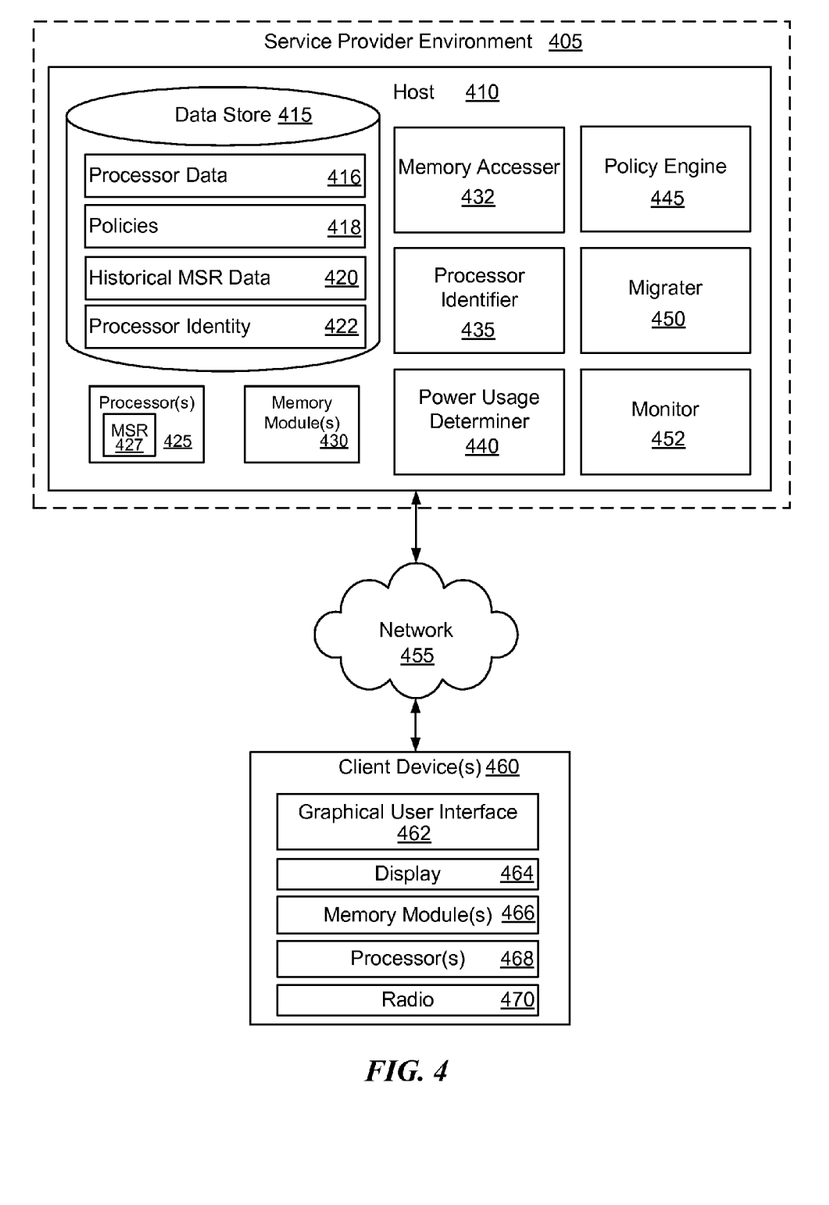
FIG. 4 is a block diagram of a system for detecting processor usage of a physical host hosting computing instances in accordance with an example of the present technology.

Referring now to FIG. 4, a block diagram of a system for detecting processor usage of a physical host hosting a plurality of computing instances is illustrated in accordance with an example of the present technology. The system may be implemented using one or more physical hosts (e.g., host 410) in a service provider environment as well as client devices 460, and may be implemented using communications sent across a network 455. The system may include a data store 415 and a number of modules 432, 435, 440, 445, 450 for storing and processing data to be used in detecting processor usage of a physical host.

The host 410 may host a virtual computing instance as previously explained, and the virtual computing instance may be implemented using a virtualization computing environment in a service provider environment 405, which may include a virtual distributed computing system with a virtualization layer executing on a hardware substrate layer. The hardware layer may include a plurality of physical computers, servers or processing nodes. The virtualization layer (e.g., hypervisor) may provide a platform on which virtual computing instances may be created. In other words, the virtual computing instances may execute on the hardware layer by using the platform provided by the virtualization layer. This computing service architecture that supports computing instances is illustrated in more detail in FIG. 3.

The system may include a number of client devices 460 that may be in communication with the host 410 or computing instances hosted thereon by way of a wired or wireless network 455. The host 410 may be a computing device and may respond to requests from client devices 460 for services or application data available through the host 410. Operations may be computed in the system using certain services and/or modules that may be executed on the host 410 to perform desired functions for the technology. In one example configuration, the host 410 may include a memory accesser 432, a processor identifier 435, power usage determiner 440, a policy engine 445, a migrater 450, a monitor 452 and other services, processes, systems, engines, or functionality not discussed in detail herein.

Various types of data may be stored in a data store 415 that is accessible to the system. The term "data store" may refer to any device or combination of devices capable of storing, accessing, organizing and/or retrieving data, which may include any combination and number of data servers, relational databases, object oriented databases, cloud storage systems, data storage devices, data warehouses, flat files and data storage configuration in any centralized, distributed, or clustered environment. The storage system components of the data store 415 may include storage systems such as a SAN (Storage Area Network), cloud storage network, volatile or non-volatile RAM, optical media, or hard-drive type media. The data store 415 may be representative of a plurality of data stores 415 as can be appreciated.

In one example, the data store 415 may store data such as processor data 416. The processor data 416 may include, for example, a code or other identifier identifying the processor, information about the processor such as a make and model of the processor, a thermal design point of the processor and so forth. The processor data 416 may further include data about the model specific register(s) 427 of a processor 425. The model specific register data may include the current power drain on the processor. The data store 415 may further optionally include historical model specific register data 420 to enable a review of the power usage of the processor over time.

The memory accesser 432 may be configured to provide data store access to the processor data 416. The memory accesser 432, as well as the other services modules, engines, etc. illustrated in FIG. 4, may be executed on a hypervisor for the physical host 410 hosting the computing instances or servers or the memory accesser 432 may be executed on the computing instances or servers. The memory accesser 432 may make API calls, perform SDK functions, and facilitate command line tools or the like to access the processor data 416. For example, the processor power draw or other processor data 416 may be exposed to the computing instances by accessing a Uniform Resource Locator (URL) for the data made available as text or in another computer readable format. The processor power draw may be provided as a processor utilization, where the power draw correlates with processor utilization.

A processor identifier 435 may be configured to identify a processor 425 of the physical host 410. The processor identifier 435 may identify information about the processor 425, such as a thermal design point of the processor 425. For example, the processor identifier 435 may correlate the processor data 416 with processor identity data 422 to identify the information about the processor 425, including the thermal design point, the manufacturer, the model, or any other desired information. The processor identity data 422 may include a number of processor identities to be used in the correlation by the processor identifier 435. The system processor identifier service 435 may store the information identified for the processor 425 in the data store 415 with the processor data 416 to be available for use by the power usage module determiner 440.

The power usage determiner 440 may be configured to determine a current processor power usage based on processor power consumption data included in the processor data 416 and based on the thermal design point of the processor identified by the processor identifier 435 and stored in the processor data 416. The power usage determiner 440 may be further configured to calculate the current processor usage by estimating a current processor usage as a percentage of total available processor usage derived from or based on the thermal design point and the processor power consumption data.

The policy engine 445 may enable a customer, via a client device 460, to define noisy neighbor remediation policies which may be stored in a policies data store 418. The policy engine 445 may further be configured to implement or enforce one or more noisy neighbor remediation policies when the processor usage is above a predetermined threshold. For example, when the processor usage (e.g., power usage) is above the predetermined threshold, the policy engine 445 may identify that a noisy neighbor scenario exists and initiate a migration of the computing instance from the host 410 to another host computing system in the service provider environment 405. The migrater 450 may be configured to migrate the server hosted on the physical host to a second physical host according to the noisy neighbor remediation policy when instructed by the policy engine 445. While the policy engine 445 is illustrated within the host 410, the policy engine may be controlled by a hypervisor or by the computing instances hosted on the host 410 or may be present at each with different policies at each.

A monitor 452 may be configured to monitor the availability or usage of the processor over time. The historical MSR data 420 may be stored in the data store 415. The monitor 452 may determine an average processor usage based on the monitored historical MSR data 420. In one example, the policy engine 445 may be configured to implement the noisy neighbor remediation policy when the average processor usage is above a predetermined threshold.

The host 410 may contain various processes and/or other functionality that may be executed on one or more processors 425 that are in communication with one or more memory modules 430 according to various examples. The host 410 may comprise, for example, a server with computing hardware or any other system providing computing capability. Alternatively, a number of hosts 410 may be employed that are arranged, for example, in one or more server banks or computer banks or other arrangements. For purposes of convenience, the host 410 is referred to in the singular. However, it is understood that a plurality of computing devices may be employed as hosts 410 in the various arrangements as described above.

A client device 460 may include any device that may be capable of sending and receiving data over a network 455. A client device 460 may comprise, for example a processor-based system such as a computing device. Such a computing device may contain one or more processors 468, one or more memory modules 466 and may, in some examples, include a graphical user interface 462. In one example, the client device 460 may be a set-top box or a set-top unit that may be connected to a network and a monitor or a TV. Also, a client device 460 may be a device such as, but not limited to, a desktop computer, laptop or notebook computer, tablet computer, smartphone, smart TV, digital music player, electronic book reader, mobile computing device, or other devices with like capability.

Additionally, the client device 460 may contain a radio 470 that enables the client device 460 to connect to a network 455 by way of a wireless local area network connection such as WI-FI. The client device 460 may include a display 464, such as a liquid crystal display (LCD) screen, gas plasma-based flat panel display, LCD projector, cathode ray tube (CRT), or other types of display devices, etc. Client devices 460 may or may not include a display. Some additional example client devices may include a desktop computer, a laptop, a tablet, a mobile device, a television, a cell phone, a smart phone, a hand held messaging device, a personal data assistant, an electronic book reader, heads up display (HUD) glasses, or the like. The client device 460 may include other types of radios 470 as well, such as to communicate over a network 455 or with one or more other client devices connected to the network 455 using Bluetooth, LTE, NFC, Zigbee or other suitable communication technologies.

The network 455 may include any useful computing network, including an intranet, the Internet, a local area network, a wide area network, a wireless data network, or any other such network or combination thereof. Components utilized for such a system may depend at least in part upon the type of network and/or environment selected. Communication over the network may be enabled by wired or wireless connections and combinations thereof.

The modules that have been described may be stored on, accessed by, accessed through, or executed by a computing device. The computing device may comprise, for example, a server computer or any other system providing computing capability. Alternatively, a plurality of computing devices may be employed that are arranged, for example, in one or more server banks, blade servers or other arrangements. For example, a plurality of computing devices together may comprise a clustered computing resource, a grid computing resource, and/or any other distributed computing arrangement. Such computing devices may be located in a single installation or may be distributed among many different geographical locations. For purposes of convenience, the computing device is referred to herein in the singular form. Even though the computing device is referred to in the singular form, however, it is understood that a plurality of computing devices may be employed in the various arrangements described above.

Certain processing modules may be discussed in connection with this technology. In one example configuration, a module may be considered a service with one or more processes executing on a server or other computer hardware. Such services may be centrally hosted functionality or a service application that may receive requests and provide output to other services or customer devices. For example, modules providing services may be considered on-demand computing that is hosted in a server, cloud, grid or cluster computing system. An application program interface (API) may be provided for each module to enable a second module to send requests to and receive output from the first module. Such APIs may also allow third parties to interface with the module and make requests and receive output from the modules.

Various applications and/or other functionality may be executed in the computing device according to various implementations, which applications and/or functionality may be represented at least in part by the modules that have been described. Also, various data may be stored in a data store that is accessible to the computing device. The data store may be representative of a plurality of data stores as may be appreciated. The data stored in the data store, for example, may be associated with the operation of the various modules, applications and/or functional entities described. The components executed on the computing device may include the modules described, as well as various other applications, services, processes, systems, engines or functionality not discussed in detail herein.

The client device 460 shown in FIG. 4 may be representative of a plurality of client devices 460 that may be coupled to the network 455. The client device(s) 460 may communicate with the computing device over any appropriate network, including an intranet, the Internet, a cellular network, a local area network (LAN), a wide area network (WAN), a wireless data network or a similar network or combination of networks. Although a specific structure may be described herein that defines server-side roles (e.g., of content delivery service) and client-side roles (e.g., of the content access application), it is understood that various functions may be performed at the server side or the client side.

Figure 5:
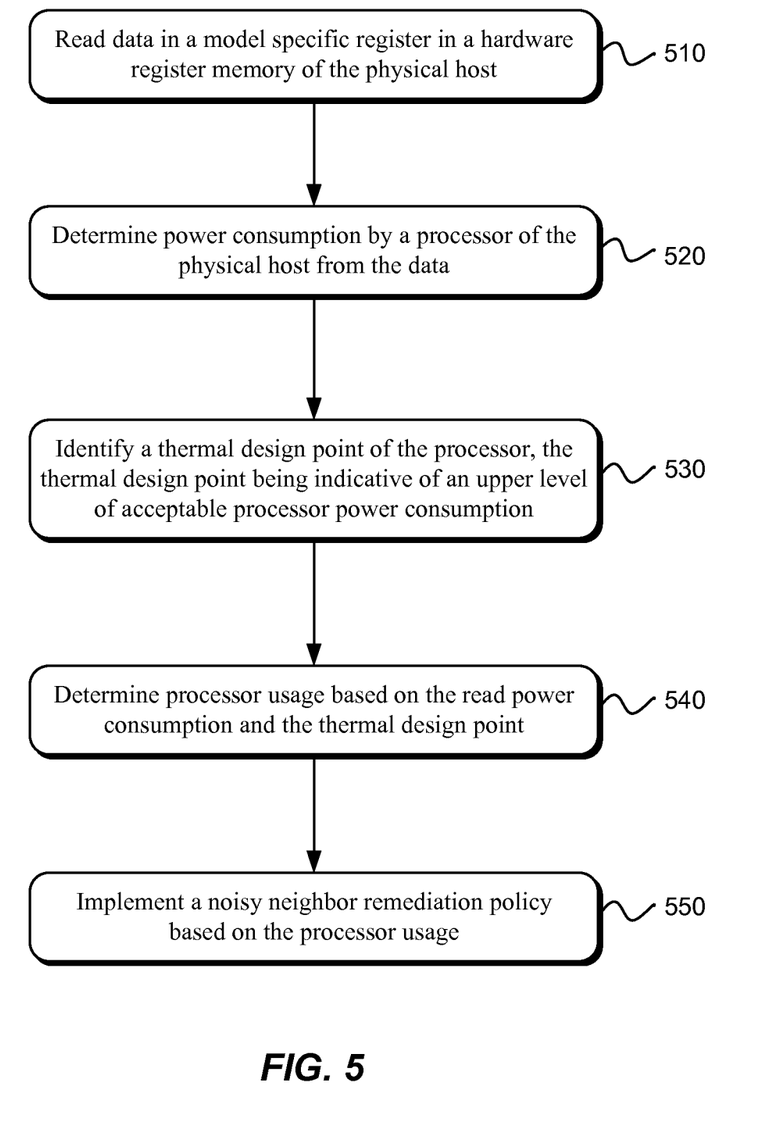
FIGS. 5-6 are flow diagrams of methods for detecting processor usage of a physical host hosting computing instances in accordance with examples of the present technology.
Figure 6:
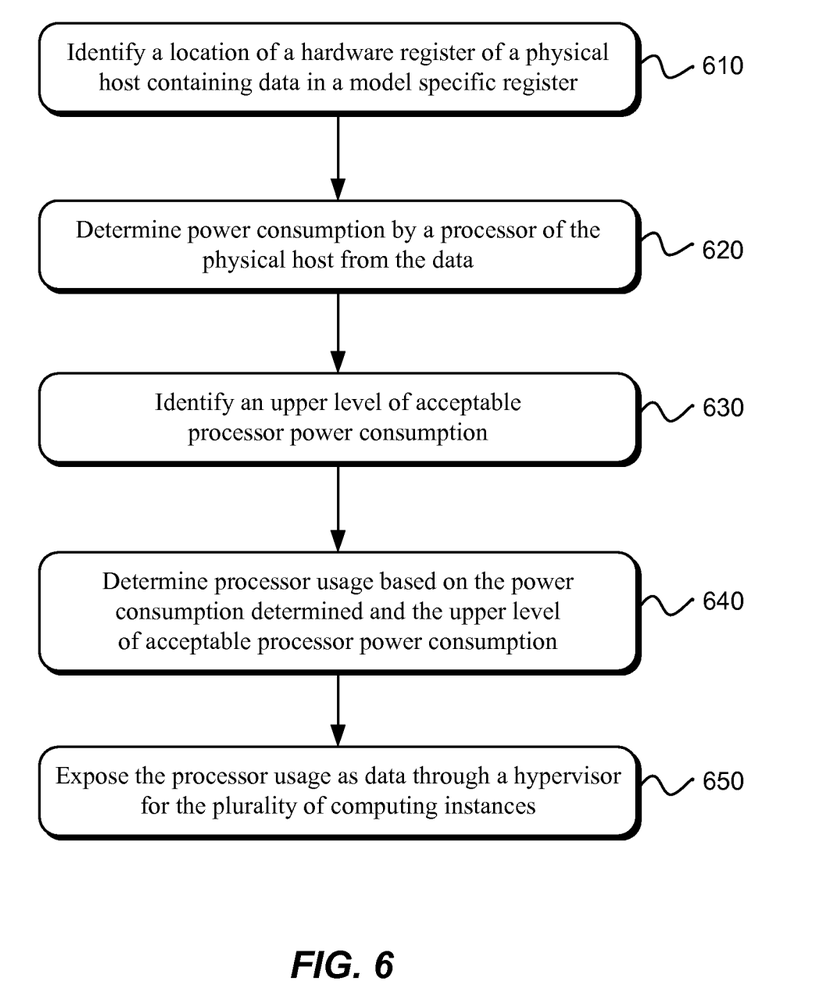

FIGS. 5-6 illustrate flow diagrams of methods according to the present technology. For simplicity of explanation, the method is depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Any of a variety of other process implementations which would occur to one of ordinary skill in the art, including but not limited to variations or modifications to the process implementations described herein, are also considered to be within the scope of this disclosure.

Referring now to FIG. 5, a flow diagram of a method is illustrated for detecting processor usage of a physical host hosting computing instances. The method may include reading 510 data in a model specific register in a hardware register memory of the physical host. Power consumption by a processor of the physical host may be determined 520 from the data. The computing instance may be restricted from modifying the data at the model specific register. The computing instance may further be restricted from reading the data at the model specific register and instead may access the data, or a derivation of the data, from a hypervisor for the computing instance, and the hypervisor may be programmatically enabled to access the model specific register.

A thermal design point of the processor may be identified 530. The thermal design point may be indicative of an upper level of acceptable processor power consumption. The thermal design point may be identified by, for example, identifying the processor, such as by make and model, and performing a lookup of the thermal design point based on the identification of the processor. Processor usage may be determined 540 based on the power consumption and the thermal design point. The method may also include implementing 550 a noisy neighbor remediation policy based on the processor usage. For example, the method may include migrating the computing instance to a different physical host when the processor usage is above a predetermined threshold. As another example, the method may include initiating a turbo boost of the processor when the processor usage is above a predetermined threshold. As another example, the method may include canceling initiation of software processes on the computing instance when the processor usage is above a predetermined threshold. Any of a variety of other desired noisy neighbor remediation policies may be implemented as would be understood based on the present disclosure. In one example, a modification may be made to a scheduling policy for placing a new computing instance based on the processor usage. The modification may be the noisy neighbor remediation policy or the implementation of the noisy neighbor remediation policy. For example, if a processor power consumption or processor usage is above the predetermined threshold, then the scheduling policy or a scheduling analysis system may be modified to schedule new computing instances on droplets or physical hosts to avoid the physical host with the noisy neighbor. In another example, the power consumption or processor usage may be made available to customers prior to deployment of a computing instance to a physical host for the customer to evaluate the availability of the processor in view of the customer's anticipated usage.

In some examples, this or other methods described herein may be implemented wholly or partially as computer readable program code executed by a processor and the computer readable code may be embodied on a non-transitory computer usable medium.

Referring now to FIG. 6, a flow diagram of a method is illustrated for resuming playback of media. The method may include identifying 610 a location of a hardware register of a physical host containing data in a model specific register. The physical host may host a plurality of computing instances using a hypervisor. The method may include determining 620 power consumption by a processor of the physical host for the computing instances from the data. An upper level of acceptable processor power consumption may be identified 630. The upper level of acceptable processor power consumption may by a thermal design point, a power consumption threshold above the thermal design point or another suitable power consumption level. The method may identify the upper level of acceptable processor power consumption by identifying a thermal design point of the processor. The upper level of acceptable processor power consumption may be identified by identifying an acceptable power consumption increase over the thermal design point. Processor usage may be determined 640 based on the power consumption determined and the upper level of acceptable processor power consumption. The processor usage may be exposed 650 as data through the hypervisor. A processor usage action may be performed in response to the data of the processor usage. The processor usage action may be a noisy neighbor remediation policy, sending a notice to an administrator, triggering a business rule (e.g., changing customer charges for sharing with a noisy tenant), for example.

The method may include implementing the noisy neighbor remediation policy based on the processor usage. For example, the method may include migrating the computing instance to a different physical host when the processor usage is above a predetermined threshold. Migrating may include automatically migrating to the different physical host when the processor usage is above a predetermined threshold. In another example, the method may include initiating a turbo boost of the processor or overclocking the processor when the processor usage is above a predetermined threshold.

The method may include reading the power consumption by the processor by reading the power consumption for a plurality of cores and/or sockets of the processor. The method may also include monitoring the power consumption of the processor for the physical host over a predetermined period of time. A determination may be made as to whether to implement a noisy neighbor remediation policy based on the processor usage at a given point over the predetermined period of time, based on an average processor usage over the predetermined period of time, based on processor usage at peaks occurring during the predetermined period of time, or based on other desired standards.

The method may include accessing the data in the hardware specific register of the physical host by accessing a Uniform Resource Locator exposing metadata of the physical host, the metadata including the data in the hardware register. The method may also include determining an identity of the processor, and identifying the upper level of acceptable processor power consumption based on the identity of the processor.

Figure 7:
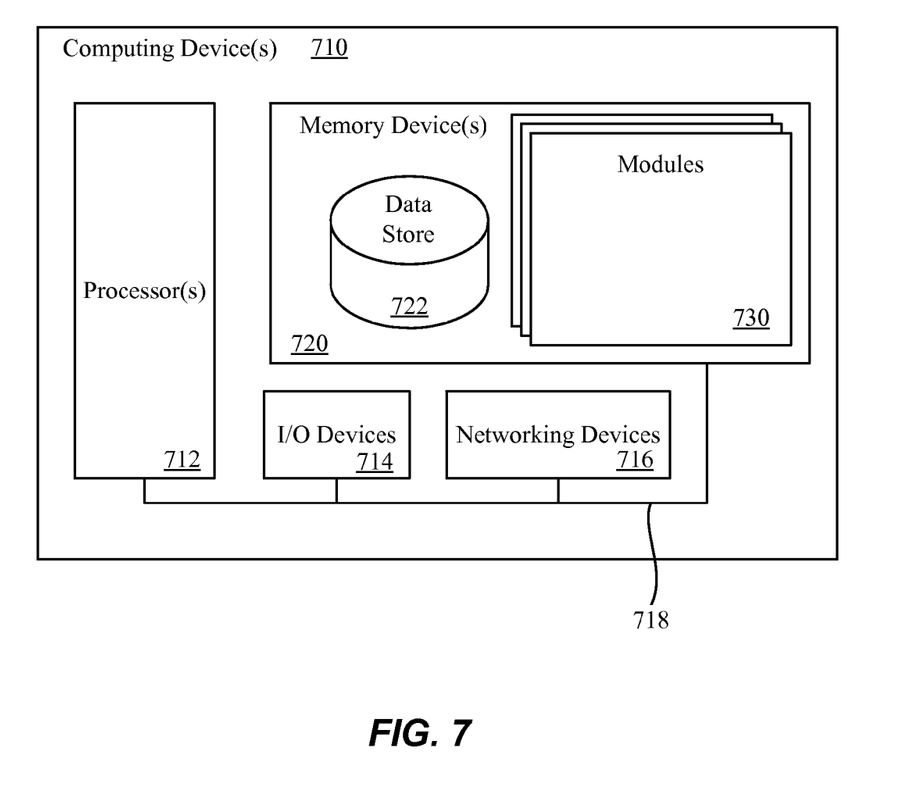
FIG. 7 is a block diagram of a computing system for use in detecting processor usage in accordance with an example of the present technology.

FIG. 7 illustrates a computing device 710 on which services or modules of this technology may execute. A computing device 710 is illustrated on which a high level example of the technology may be executed. The computing device 710 may include one or more processors 712 that are in communication with memory devices 720. The computing device 710 may include a local communication interface 718 for the components in the computing device. For example, the local communication interface 718 may be a local data bus and/or any related address or control busses as may be desired.

The memory device 720 may contain modules 730 that are executable by the processor(s) and data for the modules. A data store 722 may also be located in the memory device 720 for storing data related to the modules and other applications along with an operating system that is executable by the processor(s) 712.

The computing device 710 may further include or be in communication with a client device, which may include a display device. The client device may be available for an administrator to use in interfacing with the computing device 710, such as to review operation of a virtual computing instance, make improvements to machine learning models and so forth.

Various applications may be stored in the memory device 720 and may be executable by the processor(s) 712. Components or modules discussed in this description that may be implemented in the form of software using high programming level languages that are compiled, interpreted or executed using a hybrid of the methods.

The computing device 710 may also have access to I/O (input/output) devices 714 that are usable by the computing devices. An example of an I/O device 714 is a display screen that is available to display output from the computing devices. Other known I/O device may be used with the computing device as desired. Networking devices 716 and similar communication devices may be included in the computing device 710. The networking devices 716 may be wired or wireless networking devices 716 that connect to the internet, a LAN, WAN, or other computing network.

The components or modules that are shown as being stored in the memory device 720 may be executed by the processor 712. The term "executable" may mean a program file that is in a form that may be executed by a processor 712. For example, a program in a higher level language may be compiled into machine code in a format that may be loaded into a random access portion of the memory device 720 and executed by the processor 712, or source code may be loaded by another executable program and interpreted to generate instructions in a random access portion of the memory to be executed by a processor 712. The executable program may be stored in any portion or component of the memory device 720. For example, the memory device 720 may be random access memory (RAM), read only memory (ROM), flash memory, a solid state drive, memory card, a hard drive, optical disk, floppy disk, magnetic tape, or any other memory components.

The processor 712 may represent multiple processors and the memory 720 may represent multiple memory units that operate in parallel to the processing circuits. This may provide parallel processing channels for the processes and data in the system. The local interface may be used as a network to facilitate communication between any of the multiple processors and multiple memories. The local interface may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology. The computer readable storage medium may, for example, be in the form of a non-transitory computer readable storage medium. As used herein, the terms "medium" and "media" may be interchangeable with no intended distinction of singular or plural application unless otherwise explicitly stated. Thus, the terms "medium" and "media" may each connote singular and plural application.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

It is noted that any of the distributed system implementations described above, or any of their components, may be implemented as one or more web services. In some implementations, a web service may be implemented by a software and/or hardware system designed to support interoperable machine-to-machine interaction over a network. A web service may have an interface described in a machine-processable format, such as the Web Services Description Language (WSDL). Other systems may interact with the web service in a manner prescribed by the description of the web service's interface. For example, the web service may define various operations that other systems may invoke, and may define a particular application programming interface (API) to which other systems may be expected to conform when requesting the various operations.

In various implementations, a web service may be requested or invoked through the use of a message that includes parameters and/or data associated with the web services request. Such a message may be formatted according to a particular markup language such as Extensible Markup Language (XML), and/or may be encapsulated using a protocol such as Simple Object Access Protocol (SOAP). To perform a web services request, a web services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some implementations, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

The invention claimed is:

1. A physical host with a computing instance that is configured to detect processor usage of the physical host hosting a plurality of computing instances, comprising:
   a processor of the physical host;
   a memory in electronic communication with the processor;
   instructions stored in the memory, the instructions being executable by the processor to:
   read data from a model specific register located in a hardware register memory of the physical host;
   determine, using a computing instance executing on the physical host, power consumption by the processor of the physical host from the data, wherein the power consumption is caused by a plurality of computing instances, and the data is received at the computing instance through a hypervisor;
   identify, using the computing instance, a thermal design point of the processor, the thermal design point being indicative of an upper level of acceptable processor power consumption;
   determine, using the computing instance, processor usage based on the power consumption as compared to the thermal design point; and
   implement a noisy neighbor remediation policy based on the processor usage.

2. The computing instance of claim 1, wherein the computing instance is configured to implement the noisy neighbor remediation policy by migrating the computing instance to a different physical host when the processor usage is above a predetermined threshold.

3. The computing instance of claim 1, wherein the computing instance is configured to implement the noisy neighbor remediation policy by initiating a turbo boost of the processor when the processor usage is above a predetermined threshold.

4. The computing instance of claim 1, wherein the computing instance is configured to implement the noisy neighbor remediation policy by canceling initiation of software processes on the computing instance when the processor usage is above a predetermined threshold.

5. The computing instance of claim 1, wherein the data from the model specific register is stored as metadata in the hypervisor for the computing instance.

6. The computing instance of claim 1, wherein the computing instance is configured to make a modification to a scheduling policy for placing a new computing instance based on the processor usage, wherein the modification is the noisy neighbor remediation policy.

7. A computer-implemented method, comprising:
   identifying a location of a hardware register of a physical host containing data in a model specific register defined to track power consumption, using a processor, the physical host hosting a plurality of computing instances;
   determining, using a computing instance executing on the physical host, power consumption by a processor of the physical host for the plurality of computing instances from the data, wherein the data is received at the computing instance through a hypervisor;
   identifying, using the computing instance, an upper level of acceptable processor power consumption;
   determining, using the computing instance, processor usage based on the power consumption determined and the upper level of acceptable processor power consumption, using the processor;

performing a processor usage action in response to the processor usage.

8. The method of claim 7, further comprising implementing a noisy neighbor remediation policy based on the processor usage as the processor usage action.

9. The method of claim 7, further comprising identifying the upper level of acceptable processor power consumption by identifying a thermal design point of the processor.

10. The method of claim 9, further comprising identifying the upper level of acceptable processor power consumption by identifying an acceptable power consumption increase over the thermal design point.

11. The method of claim 7, further comprising migrating the computing instance to a different physical host when the processor usage is above a predetermined threshold as the processor usage action.

12. The method of claim 7, further comprising initiating a turbo boost of the processor when the processor usage is above a predetermined threshold as the processor usage action.

13. The method of claim 7, wherein reading the power consumption by the processor comprises reading the power consumption for a plurality of cores of the processor.

14. The method of claim 7, further comprising monitoring the power consumption of the processor for the physical host over a predetermined period of time and determining whether to implement the processor usage action based on the processor usage.

15. The method of claim 7, further comprising accessing the data in the model specific register of the physical host by one of the plurality of computing instances by accessing a Uniform Resource Locator exposing metadata of the physical host including the data in the hardware register.

16. The method of claim 7, further comprising determining an identity of the processor, and identifying the upper level of acceptable processor power consumption based on the identity of the processor.

17. A non-transitory computer-readable medium comprising computer-executable instructions which implement a system, comprising:

a memory accesser configured to provide access to register data memory which is configured to store register data of a model specific register of a processor of a physical host, wherein the memory accesser is executed on a hypervisor for the physical host;

a processor identifier, within a computing instance executing on the physical host, configured to identify a processor of the physical host and identify information about the processor, the information including at least a thermal design point of the processor;

a power usage determiner, within the computing instance, configured to determine a processor usage based on processor power consumption data included in the register data and based on the thermal design point of the processor, wherein power consumption is caused by a plurality of computing instances, and the processor power consumption data is received at the computing instance through the hypervisor; and a policy engine configured to implement a noisy neighbor remediation policy when the processor usage is above a predetermined threshold.

18. The computer-readable medium of claim 17, further comprising a migrater configured to migrate a computing instance hosted on the physical host to a second physical host according to the noisy neighbor remediation policy when the processor usage is above the predetermined threshold.

19. The computer-readable medium of claim 17, further comprising a monitor configured to monitor the processor usage over time and determine an average processor usage, wherein the policy engine implements the noisy neighbor remediation policy when the average processor usage is above a predetermined threshold.

20. The computer-readable medium of claim 17, wherein the power usage determiner is configured to calculate availability of the processor by estimating a processor usage as a percentage of total available processor usage derived from the thermal design point and the processor power consumption data.

* * * * *